L. STOLL.
ELASTIC WHEEL TIRE.
APPLICATION FILED OCT. 14, 1921.
1,436,366.
Patented Nov. 21, 1922.
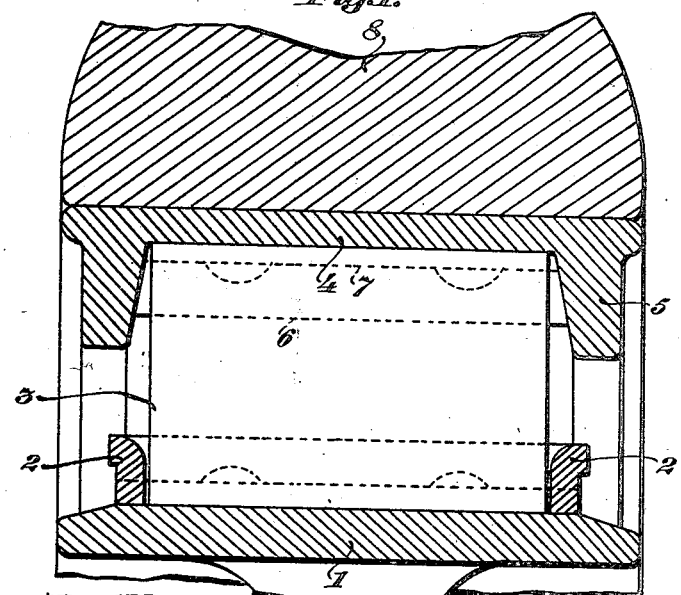
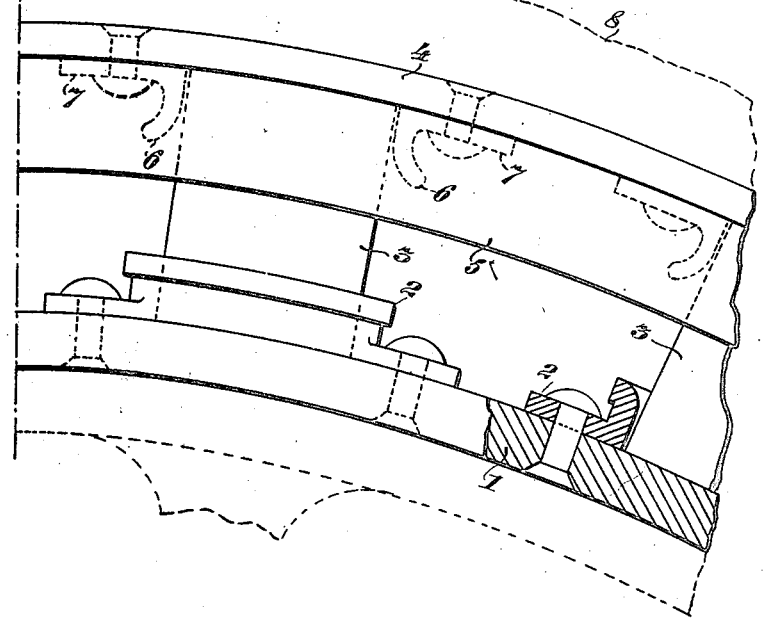
Inventor
Ludwig Stoll,
By B. Snizer, Atty.

Patented Nov. 21, 1922.

1,436,366

UNITED STATES PATENT OFFICE.

LUDWIG STOLL, OF VIENNA, AUSTRIA, ASSIGNOR TO THE FIRM "SEMBUSTO" ELASTISCHE RADBEREIFUNGEN GESELLSCHAFT M. B. H., OF VIENNA, AUSTRIA.

ELASTIC WHEEL TIRE.

Application filed October 14, 1921. Serial No. 507,805.

*To all whom it may concern:*

Be it known that I, LUDWIG STOLL, a citizen of Germany, and a resident of Vienna, Austria, have invented a new and useful Elastic Wheel Tire, of which the following is a specification.

The invention relates to elastic wheel tires in which elastic elements are interposd between an outer ring, to which may be applied preferably an outer solid rubber tire and the rim or inner ring, said elements being arranged in suitable distances from each other.

According to the present invention the inner end of the elastic elements or bodies are directly supported upon the wheel rim or inner ring and are held in position by separated frames secured to said rim or ring, whereas the outer ends of the elastic bodies are held in position between inner reinforcing ribs and separated angle irons.

In the accompanying drawings

Fig. 1 is a cross sectional view and shows a form of the improved elastic wheel tire. Fig. 2 is a partial side elevation of the same.

The improved tire comprises an inner ring 1 which may form the wheel rim itself (Fig. 1) or may be applied thereto (Fig. 2), and a series of frames 2 secured to said ring 1 by bolts or the like. The said frames together with the circumference of the ring 1 form the seat for the inner ends of elastic bodies 3 made of india rubber or the like, said bodies being therefore in direct contact with the peripheral face of the ring; whereby the radial dimension of the entire construction is materially restricted. The outer ends of the elastic bodies 3 are held between inner reinforcing ribs or flanges 5 of an outer ring 4 and between the radial branches 6 of two separated angle irons 7, which are arranged between said ribs 5 and secured to the ring 4 by means of bolts or the like. The branches 6 of the angle irons are preferably curved in the manner of a corn, in order to allow the required deformations of the bodies 3 in circumferential direction. Similarly the inner walls of the ribs 5 are bevelled off or curved, in order to allow the deformations of the bodies 3 in lateral or transversal direction. An outer elastic tread, preferably a solid india rubber ring 8 may be applied to the periphery of the tire 8. Besides the restriction of the radial constructional dimension the invention enables the outer elastic or solid india rubber tread to be worn out partially or entirely without affecting the efficiency of the tire system. Thus the working and preserving expenses are materially diminished. Moreover the invention enables the vehicle to be extremely saved, and each individual elastic element (2, 3, 77) forms a unit being independent from the neighbouring elements, this results in a great advantage in respect to the delivery and replacing of the elements.

Claim:

In a vehicle wheel, an inner rim, an outer rim spaced from the inner rim and having inwardly extending side flanges, elastic bodies in direct contact with and between said inner and outer rims and arranged with their outer ends between the side flanges of the outer rim, angle irons arranged transversely on the inner side of the outer rim and holding said elastic bodies in place at their outer ends, and frames around the inner ends of said elastic bodies and secured to the inner rim.

LUDWIG STOLL.